United States Patent
Hannig

(10) Patent No.: US 9,650,483 B2
(45) Date of Patent: May 16, 2017

(54) CARRIER PLATE FOR DECORATIVE PANEL

(71) Applicant: AKZENTA PANEELE + PROFILE GMBH, Kaisersesch (DE)

(72) Inventor: Hans-Jürgen Hannig, Bergisch Gladbach (DE)

(73) Assignee: AKZENTA PANEELE + PROFILE GMBH, Kaisersesch (DE)

( * ) Notice: Subject to any disclaimer, the term of this patent is extended or adjusted under 35 U.S.C. 154(b) by 5 days.

(21) Appl. No.: 14/764,203

(22) PCT Filed: Dec. 3, 2013

(86) PCT No.: PCT/EP2013/075329
§ 371 (c)(1),
(2) Date: Jul. 29, 2015

(87) PCT Pub. No.: WO2014/117887
PCT Pub. Date: Aug. 7, 2014

(65) Prior Publication Data
US 2015/0368421 A1    Dec. 24, 2015

(30) Foreign Application Priority Data
Jan. 29, 2013    (EP) ................................ 13153024

(51) Int. Cl.
*B32B 3/02*         (2006.01)
*C08J 9/00*         (2006.01)
*B29C 70/66*        (2006.01)
*B32B 5/18*         (2006.01)
*B32B 5/20*         (2006.01)
*B32B 27/20*        (2006.01)
*B32B 27/32*        (2006.01)
*B29C 43/02*        (2006.01)
*B29L 31/00*        (2006.01)

(52) U.S. Cl.
CPC ............. *C08J 9/0066* (2013.01); *B29C 43/02* (2013.01); *B29C 70/66* (2013.01); *B32B 5/18* (2013.01); *B32B 5/20* (2013.01); *B32B 27/20* (2013.01); *B32B 27/32* (2013.01); *B32B 27/322* (2013.01); *B29L 2031/722* (2013.01); *B32B 2266/025* (2013.01); *B32B 2266/0214* (2013.01); *B32B 2266/0228* (2013.01); *B32B 2266/0235* (2013.01); *B32B 2266/0257* (2013.01); *B32B 2266/0264* (2013.01); *B32B 2266/0278* (2013.01); *B32B 2266/08* (2013.01); *B32B 2471/00* (2013.01); *C08J 2323/06* (2013.01); *C08J 2323/12* (2013.01); *C08J 2323/20* (2013.01); *C08J 2327/06* (2013.01); *Y10T 428/24777* (2015.01); *Y10T 428/24851* (2015.01); *Y10T 428/24893* (2015.01)

(58) Field of Classification Search
CPC .. B32B 27/32; B32B 5/18; B32B 5/20; B32B 2266/025; C08J 2323/06; C08J 2323/12; C08J 9/0066
See application file for complete search history.

(56) References Cited

U.S. PATENT DOCUMENTS

| | | | |
|---|---|---|---|
| 2008/0008869 A1 | 1/2008 | Good et al. | |
| 2009/0030095 A1* | 1/2009 | Laverdure | C08J 9/0066 521/60 |
| 2012/0276348 A1 | 11/2012 | Clausi et al. | |

FOREIGN PATENT DOCUMENTS

| | | |
|---|---|---|
| EP | 1207246 A1 | 5/2002 |
| EP | 1502726 A1 | 2/2005 |

OTHER PUBLICATIONS

International Search Report, PCT/EP2013/075329, dated Apr. 10, 2014, 2 pages.
Written Opinion, PCT/EP2013/075329, dated Apr. 10, 2014, 7 pages.
International Preliminary Report on Patentability, PCT/EP2013/075329, dated Aug. 4, 2015, 8 pages.

* cited by examiner

*Primary Examiner* — Elizabeth Mulvaney
(74) *Attorney, Agent, or Firm* — Senniger Powers LLP

(57) ABSTRACT

A carrier plate for a decorative panel comprising a partly foamed plastic plate on the basis of a filler-admixed polyolefin as a carrier plate for the production of a decorative panel, a method for producing such a plate and its use as a support plate in a decorative panel.

19 Claims, No Drawings

CARRIER PLATE FOR DECORATIVE PANEL

REFERENCE TO RELATED APPLICATIONS

This application is a U.S. national stage application of International Patent Application No. PCT/EP2013/075329, filed Dec. 3, 2013, and claims the benefit of priority of European Application No. 13153024.8, filed Jan. 29, 2013, the entire disclosures of which are incorporated herein by reference.

FIELD OF THE INVENTION

The present invention relates to a carrier plate for a decorative panel. The present invention in particular relates to the use of a partly foamed plastic plate on the basis of a filler-admixed polyolefin as a carrier plate for the production of a decorative panel.

BACKGROUND

The term decorative panel in the sense of the invention means wall, ceiling or floor panels comprising a decoration applied onto a carrier plate. Decorative panels are used in a variety of ways both in the field of interior design of rooms and for decorative cladding of buildings, for example in exhibition stand construction. One of the most common uses of decorative panels is their use as a floor covering. Herein, the decorative panels often comprise a decoration intended to replicate a natural material.

Examples of such replicated natural materials are wood species such as maple, oak, birch, cherry, ash, walnut, chestnut, wenge or even exotic woods such as Panga Panga, mahogany, bamboo and bubinga. In addition, often natural materials such as stone surfaces or ceramic surfaces are replicated.

Heretofore, such decorative panels have often been produced as laminates in which a decorative paper pre-printed with a desired decoration is applied onto a carrier plate and, in turn, a so-called overlay is applied onto the decorative paper. After optionally a backing paper has been applied to the side of the carrier plate opposite to the decorative paper, the laminate structure obtained is fixedly bonded together by use of appropriate pressure and/or heat-activated adhesives.

In dependence on the desired field of application of the decorative panels they can be manufactured of different materials. In particular, the material of the carrier can be selected depending on the field of application. Thus, the carrier may for example consist of a wood-based material, as long as the decorative panel is not exposed to excessive moisture or weather conditions. If, however, the panel should be used, for example, in wet rooms or outdoors, the carrier may for example consist of a plastic material.

Plastic materials which can be used in the production of corresponding panels are, for example, thermoplastic materials such as polyvinyl chloride, polyolefines (such as polyethylene (PE), polypropylene (PP)), polyamides (PA), polyurethanes (PU), polystyrene (PS), acrylonitril butadiene styrene (ABS), polymethyl methacrylate (PMMA), polycarbonate (PC), polyethylene terephthalate (PET), polyether ether ketone (PEEK) or mixtures or copolymerizates thereof. The plastic materials can include common fillers, such as calcium carbonate (chalk), aluminum oxide, silicagel, quartz powder, wood flour, gypsum. In addition they can be coloured in a known way.

For applying a decoration onto the carrier plate or a plate-shaped carrier it is known to apply a decorative paper printed with a corresponding decoration onto the plate-shaped carrier, for example by means of a resin layer as a bonding means previously applied to the plate-shaped carrier. Moreover, it is known to provide decorative panels with a decoration by means of so-called direct printing.

The term "direct printing" in the sense of the invention means the application of a decoration directly onto the carrier of a panel or onto an unprinted fiber material layer applied to the carrier. In contrast to the conventional methods in which a decorative layer previously printed with a desired decoration is applied onto a carrier, in direct printing the decoration is printed directly in the course of the panel manufacturing process. Here, different printing techniques such as flexographic printing, offset printing or screen printing may be used. In particular digital printing techniques such as inkjet processes or laser printing can be used.

In the sense of the invention the term fiber materials means materials such as paper and non-woven fabrics on the basis of plant, animal, mineral or even synthetic fibers as well as cardboards. Examples of fiber materials on the basis of plant fibers in addition to papers and non-woven fabrics made of cellulose fibers are boards made of biomass such as straw, maize straw, bamboo, leaves, algae extracts, hemp, cotton or oil palm fibers. Examples of animal fiber materials are keratin-based materials such as wool or horsehair. Examples of mineral fiber materials are mineral wool or glass wool.

Typically wearing or top layers for protecting the applied decorative layer are applied on top of the decorative layer. A wearing and/or top layer in the sense of the invention is a layer applied as an outer border, which in particular protects the decorative layer from abrasion or damage caused by dirt, moisture or mechanical impacts, such as abrasion.

It is often provided that a surface structure matching with the decoration is introduced in such wearing and/or top layers. A surface structure matching with the decoration means that the surface of the decorative panel has a haptically perceptual structure, which according to its shape and pattern corresponds to the applied decoration in order to achieve a reproduction of a natural material as close to the original as possible even with respect to the haptic.

In order to extend the areas of application of said decorative panels in particular in wet rooms or outdoors in addition to carriers on the basis of wood-based materials as a material of the plate-shaped carrier also plastic materials are recently increasingly used as a material for such carriers. Such panels are known for example from the international patent application WO 2010/023042A1. A disadvantage of these plate-shaped carriers is that the plastic materials used for the plate-shaped carrier, such as in particular polyvinyl chloride (PVC) is increasingly getting into the focus of public criticism, since they may involve a relevant problem potential from an environmental perspective. Thus, for example, for the production of soft PVC plasticizers, e.g. from the group of phthalates, have to be added in an amount of 20-30 wt.-% in order to ensure the desired elasticity of the PVC material. Such additives, however, in the course of recent legal regulations are considered as critical and this is the reason why it is tried to avoid the use of such substances.

SUMMARY OF THE INVENTION

Taking this into account it is an object of the present invention to provide a decorative panel on the basis of a plastic carrier, which is able to overcome the problems known from the prior art. Moreover, it is an object of the present invention to provide a method for an inexpensive production of a corresponding decorative panel.

This object is achieved by a decorative panel according to claim 1 and a method according to claim 10. Embodiments of the invention are disclosed in the dependent claims and in the following description.

Briefly, therefore, in one aspect the invention is directed to a carrier plate for a decorative panel wherein the carrier plate comprises a thermoplastic material, a filler, and a pore inducer, wherein the proportion of the filler in the carrier plate is between 10 wt. % and 60 wt. %, preferably between 20 wt. % and 45 wt. %; and the carrier plate has a porosity between 10 wt. % and 45 wt. %, wherein the porosity is calculated according to formula I:

$$100 - \frac{\rho_{Platte}}{\rho_{Rohmaterial}} * 100 \qquad (I)$$

wherein $\rho_{plate}$ corresponds to the gross density (in kg/m$^3$) of the carrier plate of the decorative panel and $\rho_{raw\ material}$ corresponds to the gross density (in kg/m$^3$) of the raw material.

In another aspect, the invention is directed to a method for producing a carrier plate having the foregoing attributes, the method comprising a) mixing at least one granulated and/or powdery thermoplastic base material with at least one filler and at least one pore inducer; b) applying the raw material produced in step a) onto a press plate or introducing the raw material into an extruder; c) heating the raw material up to a temperature between ≥80° C. and ≤220° C., preferably between ≥80° C. and ≤180° C. and pressing the raw material at a pressure between ≥0.5 kN/cm2 and ≤30 kN/cm$^2$, preferably between ≥1 kN/cm$^2$ and ≤10 kN/cm$^2$ or calendering the polymer material exiting the extruder to a desired carrier plate thickness; and d) cooling the plate to a temperature ≤90° C., preferably ≤80° C., particularly preferably ≤70° C.

DETAILED DESCRIPTION OF PREFERRED EMBODIMENTS

The invention provides a carrier plate for a decorative panel on the basis of a thermoplastic material, characterized in that the plate is made of a raw material which in addition to the thermoplastic material comprises a filler and a pore inducer, wherein the proportion of the filler in the raw material is between ≥10 wt.-% and ≤60 wt.-%, preferably between ≥20 wt.-% and ≤45 wt.-% and the carrier plate has a porosity between ≥10 wt.-% and ≤45 wt.-%, wherein the porosity is calculated according to formula I $$100 - \frac{\rho_{Platte}}{\rho_{Rohmaterial}} * 100 \qquad (I)$$

wherein $\rho_{plate}$ corresponds to the gross density (in kg/m$^3$) of the carrier plate of the decorative panel and $\rho_{raw\ material}$ corresponds to the gross density (in kg/m$^3$) of the raw material.

Surprisingly, it has been found that a carrier plate comprising the features mentioned above is highly suitable for the production of decorative panels. Here, such a carrier plate on the one hand satisfies the mechanical, optical, acoustic and haptic requirements for producing a decorative panel and on the other hand such a carrier plate can be manufactured cost-efficiently which is an economic condition for the use in the highly competitive field of the manufacture of decorative panels. It has been shown in particular that partly foamed carrier plates with a porosity between ≥10 wt.-% and ≤45 wt.-% have a sufficient mechanical strength for the use as a floor plate, even if the surface is provided only with a thin coating with a thickness in the range ≤0.2 mm.

In particular, a decorative plate according to the present invention is characterized by the fact that a decorative panel produced by use of the carrier plate according to the invention has a residual indentation according to DIN EN 649 of ≤0.05 mm, preferably ≤0.01 mm. In addition, a decorative panel produced by use of a carrier plate according to the invention passes a ball drop test according to DIN EN 438 from a height ≥1000 mm, preferably ≥1400 mm. A decorative panel produced by use of a carrier plate according to the invention shows an indentation depth ≤0.15 mm at a drop test based on DIN EN 438 from height of 600 mm with a steel ball having a weight of 224 g. In addition, decorative panels produced by use of a carrier plate according to the invention due to the porosity exhibit a good sound insulation in the use of corresponding decorative panels as a floor covering.

According to one embodiment of the invention the carrier plate has a mean pore diameter $d_{50}$ between ≥20 μm and ≤150 μm, preferably between ≥30 μm and ≤120 μm, more preferably between ≥40 μm and ≤90 μm. It has been found that the pore diameter of the pore inducers present in the carrier plate by means of the raw material has a decisive influence on the mechanical properties of the decorative panels produced by use of the carrier plate according to the invention.

According to a further embodiment of the invention it can be provided that the thermoplastic material in the carrier plate of the decorative panel comprises at least one substituted or unsubstituted polyolefin. Here, the term substituted polyolefin in the sense of the invention means an alkyl, aryl, heteroaryl and/or halogen-substituted polyolefin. Preferably the thermoplastic material in this case comprises a polyolefin selected from the group consisting of polyvinyl chloride (PVC), polyethylene (PE), polypropylene (PP), polyisobutylene (PIB), polybutylene (PB) or mixtures or co-polymers thereof.

In a particularly preferred embodiment of the invention the plastic material is substantially free of organic plasticizers, in particular free of plasticizers based on phthalate, such as diethylhexyl phthalate (DEHP) or dioctyl phthalate (DOP).

In a preferred embodiment of the invention it can be provided that the filler is selected from the group consisting of chalk, talc, kaolin, kaolinite, mica, wollastonite, dolimite, barite, quartz, barium sulfate, fluorite (fluorspar), calcium sulphate (gypsum), titanium dioxide, glass or mixtures thereof. In this case, the filler may preferably have a mean grain diameter $d_{50}$≤150 μm, preferably ≤100 μm, more preferably ≤80 μm, more preferably ≤50 μm, in particular ≤10 μm, such as between 2 μm and 4 μm. In particular, it is preferable that the mean grain diameter $d_{50}$ of the filler is in a range between 0.1 to 1.5× the mean pore diameter $d_{50}$ of the pores in the carrier plate of the decorative panel. In the use of glass as a filler this can be particularly preferably used as cullet and/or glass powder and/or in the form of glass microspheres. In a preferred embodiment of the invention the filler has a Mohs hardness in the range between ≥2.0 and ≤7.0, preferably between ≥2.0 and ≤4.0.

The proportion of closed cell pores in the carrier plate is preferably ≥50%, particularly ≥70%, more preferably ≥90%. It has been shown that in particular a closed cell pore structure can contribute to an improvement of the mechanical properties of a decorative panel produced by use of a carrier plate according to the invention.

In order to form corresponding pores in the carrier plate according to the invention all means are appropriate, which can ensure the formation of pores with a corresponding pore structure and with a corresponding pore diameter. Here, it is particularly preferred that expanding microspheres are used as pore inducers. To this end it can be provided that the raw material for the production of the carrier plates of decorative panels according to the invention comprises expandable microspheres, which expand under the impact of heat. Such microspheres may for example consist of a thermoplastic material and be filled with a hydrocarbon. By impact of heat the volume of the spheres expands by a factor of 10 to 90 due to the hydrocarbon which expands inside. According to a preferred embodiment of the invention expanding microspheres are used as pore inducers, which under heat impact exhibit an expansion in volume between 1000% and 4500%, preferably between 2000% and 4000%.

According to another embodiment of the invention it may be provided that the carrier plate of the decorative panel is produced from a raw material which includes the pore inducer in a concentration between ≥0.5% wt.-% and ≤5 wt.-%, preferably ≥0.8 wt.-% and ≤2 wt.-%, particular preferably ≥1.0 wt.-% and ≤1.8 wt.-%.

Furthermore, the carrier plate of the decorative panel can include adjuvants such as stabilizers and/or pigments. In this case, stabilizers may be added in particular for improving the UV stability. Also, it may be provided that the panel comprises flame retardants such as polybrominated diphenyl ethers (PBDEs), phosphorus-containing compounds and/or aluminum hydroxide.

According to another preferred embodiment of the invention the carrier plate of the decorative panel has a density of ≥800 g/m$^3$. Here, the density of the material is on the one hand advantageous in terms of the mechanical properties of the carrier plate and on the other hand the density has an impact on the haptic perception of the purchaser, who assesses a heavier decorative panel as a higher-quality product.

The present invention further relates to a process for producing a carrier plate of a decorative panel according to the invention, comprising the process steps:
a) mixing at least one granulated thermoplastic base material with at least one filler and at least one pore inducer;
b) applying the raw material produced in step a) onto a press plate or introducing the raw material into an extruder;
c) heating the raw material up to a temperature between ≥80° C. and ≤220° C., preferably between ≥80° C. and ≤180° C. and pressing the raw material at a pressure between ≥0.5 kN/cm$^2$ and ≤30 kN/cm$^2$, preferably between ≥1 kN/cm$^2$ and ≤10 kN/cm$^2$ or calendering the polymer material exiting the extruder to a desired carrier plate thickness; and
d) recooling the plate to a temperature ≤80° C., preferably ≤70° C., particularly preferably ≤50° C.,
in order to provide a carrier plate of a decorative panel. According to a preferred embodiment of the method a double belt press or a short-cycle press is used as a press. Herein, it is particularly preferred if the pressing surfaces comprise an inert, temperature-resistant plastic surface, such as a polytetrafluoroethylene surface.

The application of the raw material onto a press plate can be carried out according to the invention, for example, by scattering, pouring or blowing onto a press plate.

It is particularly preferred if the method for producing a carrier plate of a decorative panel is carried out as a continuous or semi-continuous process by use of a double belt press, in which the raw material is applied as a mixture upstream or within the inlet region of the press, is pressed under heat supply and then recooled, wherein the recooling is preferably implemented under pressure, most preferably while maintaining the applied pressure. The endless plates thus prepared will then be cut to an intermediate or the final size of the decorative panels. Likewise, it may be provided that the carrier plates of the decorative panels are already produced in the press at least in terms of a planar dimensions, i.e. with respect to the length or the width, so that the carrier plate only has to be cut to length after the pressing process. For heating the raw material it may be provided that the heat transfer medium used for heating, such as press plates, press belts or extruders are heated to a temperature above the temperature of the raw material to be achieved. For example, it may be provided that the heat transfer medium is heated to a temperature between ≥150° C. and ≤300° C., preferably ≥250° C.

Subsequently to the production of the carrier plate preferably a direct further processing of the carrier plate for producing a decorative panel can be implemented, wherein preferably by use of a direct printing process or a decorative film lamination process a decoration is applied directly onto the carrier plate or onto a printing substrate previously applied onto the carrier plate. It is particularly preferred if the decoration is applied by means of a digital printing process, preferably by use of radiation-curable inks. This by means of the short drying or curing time of the ink allows a highly integrative configuration of the production process, starting from the raw material for the carrier plate of the decorative panel up to the finished decorative panel.

Furthermore, it can be provided that prior to the application of the decorative layer a printing substrate is applied onto the plate-shaped carrier. In particular, it may be provided that as a printing substrate a composition is applied which on the one hand comprises radically curing components and on the other hand comprises polyurethane components as is known, for example, from dual-cure coating systems. Here, it may in particular be provided that the printing substrate includes urethane acrylates. In addition, the printing substrate can in particular include pigments, such as, for example, titanium dioxide.

Subsequently or prior to the application of the decoration a process for profiling the edges may be provided, in which by means of, for example, machining processes functional and/or decorative profiles can be produced at least along one edge of the carrier plate. Herein the functional profiles can be configured such that by means of these individual panels can be releasably interconnected in order to form a continuous planking area when installed. Decorative profiles can, for example, be produced between two adjacent panels in the planking area in order to form a V-joint or a joint of a wide plank.

Furthermore, according to the invention it can be provided that a top and/or wear-resistant layer is applied onto the decoration or the ink layer forming the decoration. It may in particular be provided that a wear-resistant lacquer layer preferably on the basis of a radiation-curable lacquer is applied onto the decorative color layer and dried or cured.

This, too, supports the integration of the manufacturing process to an in-line manufacturing process at the end of which a finished decorative panel is obtained. Along with the decorative ink layer or the decorative film and/or with the wear-resistant layer a backing layer can be applied to the side of the carrier plate opposite to the decoration in order to avoid warpage of the panel e.g. by means of so-called cupping. To this end it may be in particular provided that a backing film or a lacquer layer is applied.

Furthermore, the invention relates to a decorative panel comprising a carrier plate according to the invention and a decorative layer applied onto at least one side of the carrier plate.

According to a preferred embodiment of the invention the decorative panel comprises a printing substrate between the carrier plate and the decorative layer and/or a top and/or wear-resistant layer on the decorative layer and/or a backing layer on the side of the carrier plate opposite to the decorative layer. Herein, it may in particular be provided that the top and/or wear-resistant layer and/or the backing layer are formed from a radiation-curable, preferably transparent or translucent composition.

According to another embodiment of the invention it can be provided that the decorative panel has a profiling at least in an edge region of the carrier plate. Here, it may in particular be provided that the decoration is applied also in the region of the profiling, so that the profiling process is performed prior to the application of the decorative layer onto the plate-shaped carrier. Alternatively or in addition a profiling process can also take place subsequently to the application of the decorative layer. In a profiling process in the sense of the invention it is provided that at least in a part of the edges of the decorative panel a decorative and/or functional profile is produced by means of suitable machining tools. A functional profile means for example the production of a groove and/or tongue profile in an edge in order to make decorative panels connectable with each other by means of the produced profiles. A decorative profile in the sense of the invention is for example a chamfer introduced in the edge region of the decorative panel, for example, in order to simulate a joint between two interconnected panels after they have been connected, such as occurring for example in so-called wide planks.

By partial profiling the decorative panel not all profiles to be provided in the finished panel are produced, but only part of the profiles, while other profiles are produced in a subsequent step. Thus, it may be provided, for example, that the decorative profile to be provided in a panel, such as a chamfer, is produced in one step, while the functional profile, e.g. tongue/groove, is produced in a subsequent step. By applying the decoration after the at least partial profiling of the carrier, such as by the processes described above such as direct printing processes an abrasion or damage of the decoration in the course of the profiling process is advantageously avoided. Thus, the decoration even in the regions of the profiling correspond in detail to the desired imitation for example of a natural material.

The invention claimed is:

1. Carrier plate for a decorative panel, the carrier plate comprising a thermoplastic material comprising at least one substituted or unsubstituted polyolefin, a filler, and a pore inducer, wherein the proportion of the filler is between ≥10 wt.-% and ≤60 wt.-%, and the carrier plate has a porosity between ≥10 wt.-% and ≤45 wt.-%, wherein the porosity is calculated according to formula I $$100 - \frac{\rho_{plate}}{\rho_{raw\,material}} * 100 \qquad (I)$$

wherein $\rho_{plate}$ corresponds to the gross density (in kg/m$^3$) of the carrier plate of the decorative panel and $\rho_{raw\,material}$ corresponds to the gross density (in kg/m$^3$) of raw material from which the plate is formed.

2. Carrier plate according to claim 1, wherein the carrier plate has a mean pore diameter $d_{50}$ between ≥20 μm and ≤150 μm.

3. Carrier plate according to claim 1, wherein the thermoplastic material comprises a polyolefin selected from the group consisting of polyvinyl chloride (PVC), polyethylene (PE), polypropylene (PP), polyisobutylene (PIB), polybutylene (PB) or mixtures or co-polymers thereof.

4. Carrier plate according to claim 1, wherein the filler is selected from the group consisting of chalk, talc, kaolin, kaolinite, mica, wollastonite, dolimite, barite, quartz, barium sulfate, fluorite (fluorspar), calcium sulphate (gypsum), titanium dioxide, glass or mixtures thereof.

5. Carrier plate according to claim 1, wherein the filler has a mean grain diameter $d_{50} \le 150$ μm.

6. Carrier plate according claim 1, wherein the proportion of closed cell pores in the carrier plate is ≥50%.

7. Carrier plate according to claim 1, wherein the pore inducer comprises expandable microspheres.

8. Carrier plate according to claim 7, wherein the pore inducer is present in a concentration between ≥0.5% wt.-% and ≤5 wt.-%.

9. Method for producing a carrier plate for a decorative panel comprising:
 a) mixing at least one granulated and/or powdery thermoplastic base material with at least one filler and at least one pore inducer to produce a raw material;
 b) applying the raw material produced in step a) onto a press plate of a double belt press or a short-cycle press or introducing the raw material into an extruder;
 c) heating the raw material up to a temperature between ≥80° C. and ≤220° C. and pressing the raw material using said double belt press or said short-cycle press at a pressure between ≥0.5 kN/cm$^2$ and ≤30 kN/cm$^2$ or calendering the polymer material exiting the extruder to a desired carrier plate thickness; and
 d) cooling the plate to a temperature ≤90° C., in order to provide a carrier plate for a decorative panel;
wherein the carrier plate has a porosity between 10 wt. % and 45 wt. %, wherein the porosity is calculated according to formula I:

$$100 - \frac{\rho_{plate}}{\rho_{raw\,material}} * 100 \qquad (I)$$

wherein $\rho_{plate}$ corresponds to the gross density (in kg/m$^3$) of the carrier plate of the decorative panel and $\rho_{raw\,material}$ corresponds to the gross density (in kg/m$^3$) of the raw material.

10. Decorative panel comprising the carrier plate of claim 1 and a decorative layer applied onto at least one side of the carrier plate, and a printing substrate between the carrier plate and the decorative layer.

11. Decorative panel of claim 10 in which at least in an edge region of the plate-shaped carrier has a profiling and wherein the profiling is configured such that a plurality of decorative panels can be releasably interconnected by means of corresponding profiles.

12. Method according to claim 9 wherein the raw material comprises between 0.5 wt. % and 5 wt. % of said pore inducer.

13. Method according to claim 9 wherein the raw material comprises between 10 wt. % and 60 wt. % of said filler.

14. Decorative panel according to claim 10 comprising a top and/or a wear-resistant layer on the top layer.

15. Decorative panel according to claim 10 comprising a backing layer on the side of the carrier plate opposite to the decorative layer.

16. Decorative panel according to claim 14 wherein the top and/or wear-resistant layer comprises a radiation-curable transparent or translucent composition.

17. Decorative panel according to claim 15 wherein the backing layer comprises a radiation-curable transparent or translucent composition.

18. Carrier plate according to claim 1 incorporated into a decorative panel having a decorative layer applied onto at least one side of the carrier plate.

19. Carrier plate according to claim 1 comprising between 20 and 45 wt. % of the filler and between 0.8 and 2 wt % of the pore inducer, wherein the carrier plate has a mean pore diameter $d_{50}$ between 40 µm and 90 µm.

* * * * *